(12) United States Patent  (10) Patent No.: US 8,446,540 B2
Lee  (45) Date of Patent: May 21, 2013

(54) DISPLAY DEVICE HAVING AN ENLARGED DISPLAY AREA

(75) Inventor: Kyoung-Don Lee, Gyeonggi-do (KR)

(73) Assignee: Samsung Display Co., Ltd. (KR)

( * ) Notice: Subject to any disclaimer, the term of this patent is extended or adjusted under 35 U.S.C. 154(b) by 586 days.

(21) Appl. No.: 11/359,211

(22) Filed: Feb. 21, 2006

(65) Prior Publication Data

US 2006/0203141 A1  Sep. 14, 2006

(30) Foreign Application Priority Data

Mar. 11, 2005 (KR) .................. 10-2005-0020491

(51) Int. Cl.
*G02F 1/1333* (2006.01)

(52) U.S. Cl.
USPC .............................. 349/58; 349/60

(58) Field of Classification Search
USPC ................................. 349/58–60, 74; 361/681
See application file for complete search history.

(56) References Cited

U.S. PATENT DOCUMENTS

| 5,422,751 | A | 6/1995 | Lewis et al. | |
| 5,640,216 | A * | 6/1997 | Hasegawa et al. | 349/58 |
| 6,220,741 | B1 | 4/2001 | Kawachi et al. | |
| 2001/0019377 | A1 * | 9/2001 | Fukayama et al. | 349/58 |
| 2002/0154474 | A1 * | 10/2002 | Merz et al. | 361/683 |
| 2003/0043314 | A1 * | 3/2003 | Lee et al. | 349/65 |
| 2003/0048598 | A1 * | 3/2003 | Lee et al. | 361/681 |
| 2004/0080952 | A1 * | 4/2004 | Chu et al. | 362/374 |
| 2004/0160546 | A1 * | 8/2004 | Huang et al. | 349/58 |
| 2004/0189889 | A1 * | 9/2004 | Nitto et al. | 349/58 |
| 2004/0239832 | A1 * | 12/2004 | Saito | 349/74 |
| 2005/0068472 | A1 * | 3/2005 | Sung et al. | 349/64 |
| 2006/0061704 | A1 * | 3/2006 | Hayano et al. | 349/58 |
| 2006/0152647 | A1 * | 7/2006 | Han et al. | 349/58 |

FOREIGN PATENT DOCUMENTS

| CN | 1407380 A | 4/2003 |
| JP | 2002-040394 A | 2/2002 |
| JP | 2002-182204 A | 6/2002 |
| JP | 2003-057646 A | 2/2003 |
| JP | 2003-149629 A | 5/2003 |
| JP | 2004-302290 A | 10/2004 |
| KR | 1020040082316 A | 9/2004 |
| KR | 1020040086188 A | 10/2004 |
| KR | 1020040097092 A | 11/2004 |

* cited by examiner

*Primary Examiner* — Jessica M Merlin
(74) *Attorney, Agent, or Firm* — Innovation Counsel LLP

(57) ABSTRACT

There is provided a display device with an enlarged display area. The display device includes a panel unit for displaying an image, a first fixing member receiving the panel unit, and a second fixing member coupled to the first fixing member. A flange extending from an edge of a body portion of the first fixing member in a direction parallel to the body portion is coupled to a receiving member formed in the second fixing member.

15 Claims, 5 Drawing Sheets

DISPLAY DEVICE HAVING AN ENLARGED DISPLAY AREA

CROSS-REFERENCE TO RELATED APPLICATION

The present application claims priority to Korean patent application No. 2005-0020491 filed in the Korean Intellectual Property Office on Mar. 11, 2005, the contents of which are herein incorporated by reference in their entirety.

BACKGROUND (a) Field of the Invention

The present invention relates to a display device with an enlarged display area, and more particularly, to a display device of which a display area is indirectly enlarged by improving a structure of a fixing member.

(b) Description of the Related Art

Thanks to recent developments in semiconductor technologies, the demand for display devices having small size, small weight, and high performance has increased dramatically.

Liquid crystal display (LCD) devices have advantages such as small size, small weight, and low power consumption. Therefore, much attention has been paid to liquid crystal display devices as a substitute for cathode ray tubes (CRTs). Recently, LCD devices have been widely used for medium or large sized office or home appliances, such as monitors and televisions, as well as small mobile products, such as cellular phones and portable digital assistants (PDAs).

Generally, an LCD device is a display device displaying information by modulating light using liquid crystal cells. This modulation is accomplished by applying a voltage to change a specific alignment of liquid crystal molecules to different alignments. The change in molecular alignment of the liquid crystals results in a change in the optical characteristics of the light passing through the liquid crystals, such as birefringence, optical rotary power, dichroism, and optical scattering.

Most small-sized display devices, such as those used in cellular phones, employ LCD devices. Recently, the demand for sliding-type cellular phones has increased, and thus LCD panels having a relatively large display area are required. Since such small-sized display devices would likely be used to display video images and other complex graphics, it is desirable to manufacture the LCD panels as large as possible.

When manufacturing an LCD panel having a large display area, it is desirable to decrease the size of the mold frame or chassis used to retain the LCD panel. When a mold frame is replaced with a chassis, a glass LCD panel can be broken by external impacts. The total size of the LCD panel may be decreased by the thickness of a chassis by attaching the LCD panel to a mold frame with a tape without forming a hook in the chassis. However, this method causes a decrease in productivity and a decrease in strength of the LCD panel.

SUMMARY

Embodiments of the present invention are directed to solving the above-mentioned problems by providing a display device in which a display area is enlarged by improving a structure of a fixing member.

According to an aspect of the present invention, there is provided a display device including a panel unit for displaying an image, a first fixing member receiving the panel unit, and a second fixing member coupled to the first fixing member. A flange extending from an edge of a body portion of the first fixing member in a direction parallel to the body portion is coupled to a receiving member formed in the second fixing member.

The first fixing member may include panel guide portions surrounding a portion of the edge of the body portion and flanges may be formed between the panel guide portions.

A side wall portion of the second fixing member may be coupled to a recess formed in the panel guide portions of the first fixing member.

The receiving member of the second fixing member may be formed in the side wall portion of the second fixing member.

The side wall portion may be formed by bending the second fixing member.

The height of the side wall portion of the second fixing member inserted in to the recess may be greater than or equal to 0.4 mm.

The side wall portion of the second fixing member may be spaced from a virtual extension surface extending from the surface of the panel unit.

Another flange may be formed on an outer surface of the panel guide portions.

The receiving member may be spaced from the panel unit.

The receiving member may be spaced by 0.2 mm or more from the panel unit.

Two or more panel units may be provided in the display device.

The panel unit may be an LCD panel.

The display device may further include a light source supplying light to the panel unit.

The display device may be used for a cellular phone.

BRIEF DESCRIPTION OF THE DRAWINGS

The above and other features and advantages of the present invention will become more apparent in light of the exemplary embodiments described below with reference to the attached drawings, in which.

DETAILED DESCRIPTION OF THE EMBODIMENTS

Display devices according to embodiments of the present invention will be described in detail below with reference to FIGS. 1 to 5. The embodiments are intended not to limit the present invention, but only to exemplify the present invention.

Figure 1:
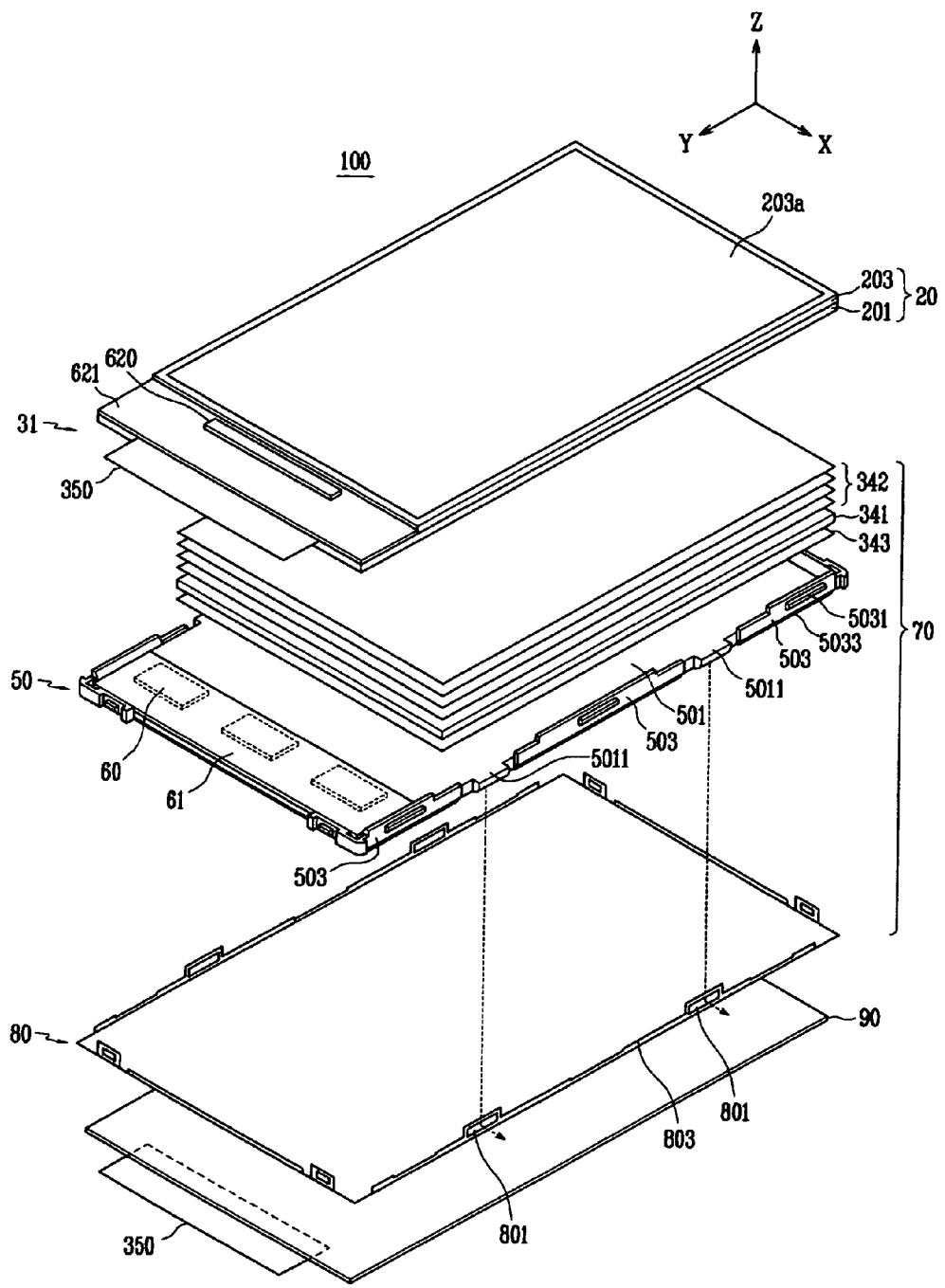
FIG. 1 is an exploded perspective view illustrating a display device according to a first embodiment of the present invention.

FIG. 1 shows a display device 100 according to a first embodiment of the present invention. The illustrated structure of the display device 100 is intended not to limit the present invention, but only to exemplify the present invention.

The display device 100 according to the first embodiment of the present invention shown in FIG. 1 includes a panel unit assembly 31 and a backlight assembly 70. The display device 100 may further include other components as needed.

The panel unit assembly 31 includes a panel unit 20 for displaying an image, an integrated circuit (IC) chip 620, a flexible printed circuit (FPC) film 350, and a printed circuit board (PCB) 90. The backlight assembly 70 supplies light to the panel unit 20. The backlight assembly 70 includes a plurality of optical sheets 342, a light guiding plate (LGP) 341, a reflecting sheet 343, a light source 60, and a circuit board 61. The panel unit assembly 31 and the backlight assembly 70 can be assembled using a first fixing member 50 and a second fixing member 80.

Although an LCD panel fitted with a polarizer 203a is shown as the panel unit 20 in FIG. 1, it is intended not to limit the present invention, but only to exemplify the present invention. An organic light emitting display (OLED), and the like, may be used instead of the LCD panel. In this case, since the OLED is a light emitting device, the light source 60 may be omitted.

A protective film 621 is coated around the IC chip 620 to protect the IC chip 620. The PCB 90 drives the panel unit 20 by transmitting external driving signals to the panel unit 20 through the FPC film 350. A circuit board 61 mounted with the light source 60 is also electrically connected to the PCB 90 and is supplied with the driving signals therefrom. Although the exploded perspective view of FIG. 1 shows the FPC film 350 separated into two pieces for clarity, in operation, the FPC film 350 comprises a single member.

The panel unit 20 includes a TFT (thin film transistor) panel 201 as a first panel, a color filter panel 203 as a second panel, and liquid crystals (not shown) injected therebetween. The TFT panel 201 is positioned opposite the color filter panel 203 and includes a plurality of thin film transistors are formed thereon. The TFT panel 201 comprises a transparent glass panel on which TFTs are formed in a matrix shape, wherein source terminals are connected to data lines and gate terminals are connected to gate lines. Pixel electrodes comprising ITO (Indium Tin Oxide), which is a transparent conductive material, are formed at drain terminals.

The data lines and the gate lines of the panel unit 20 are connected to the FPC film 350. Accordingly, when electrical signals are received from the PCB 90, the electrical signals are input to the source terminals and the gate terminals of the thin film transistors. When the thin film transistors are turned on or off depending upon the input electrical signals, electrical signals required for forming an image are output to the drain terminals. The IC chip 620 is mounted on the TFT panel 201 and controls the panel unit 20. The IC chip 620 generates a plurality of timing signals for applying, at a proper timing, data driving signals and gate driving signals for driving the display device 100, and supplies the gate driving signals and the data driving signals to the gate lines and the data lines of the panel unit 20, respectively.

The color filter panel 203 is positioned opposite the TFT panel 201. The color filter panel 203 is a panel on which RGB pixels are formed using a thin film forming process. The RGB pixels serve as color pixels for emitting predetermined colors in response to light from the backlight assembly 70 passing through the color filter panel 203. A common electrode comprising ITO is formed on the entire surface of the color filter panel 203. When power is applied to the gate terminals and the source terminals of the thin film transistors to turn the thin film transistors on, an electric filed is formed between the pixel electrodes and the common electrode of the color filter panel 203. Alignment angles of the liquid crystals positioned between the activated pixel electrodes of the TFT panel 201 and the color filter panel 203 are changed due to the electric field. The transmittance of light through the panel unit 20 is changed depending upon the changed alignment angle, thereby producing a desired image. Polarizer 201a (shown in FIG. 3) and polarizer 203a polarize the light passing through the panel unit 20.

The backlight assembly 70 for supplying uniform light to the panel unit 20 is provided below the panel unit assembly 31. The light source 60 (indicated by dotted lines) is electrically connected to the circuit board 61 and is received in the first fixing member 50. Although light emitting diodes (LEDs) are shown as the light source 60 in FIG. 1, this is intended not to limit the present invention, but only to exemplify the present invention. Another light source may be used.

The light emitted from the light source 60 is guided by the LGP 341. A portion of the light is reflected by a reflecting sheet 343 and is directed toward the panel unit 20, thereby minimizing loss of light. The quality of the guided light is improved as the light passes through the optical sheets 342. This light is then supplied to the panel unit 20.

The panel unit 20, the optical sheets 342, the LGP 341, and the light source 60 are received in the first fixing member 50. The second fixing member 80 is coupled to the first fixing member 50 to at least partially surround the outer surface of the first fixing member 50. Due to the complex shape of the first fixing member 50, the first fixing member 50 may employ a mold frame formed through injection molding. The second fixing member 80 may employ a chassis formed by machining a metal plate comprising, e.g., stainless use steel (SUS). This is intended not to limit the present invention, but only to exemplify the first fixing member and the second fixing member. In other embodiments, different materials and forming methods may be used.

The reflecting sheet 343 is positioned adjacent to the planar body portion 501 of the first fixing member 50. Flanges 5011 in the first fixing member 50 extend from the body portion 501 in a direction parallel to the body portion 501. As indicated by arrows in FIG. 1, the flanges 5011 are coupled to receiving members 801 formed in the second fixing member 80. Accordingly, the first fixing member 50 can be securely coupled to the second fixing member 80.

The first fixing member 50 further includes panel guide portions 503 extending upward from at least a portion of the edges of the body portion 501. The panel guide portions 503 retain the panel unit 20 and securely couple the panel unit 20 to the first fixing member 50. A recess 5033 is formed at the lower portion of each panel guide portion 503. Side wall portions 803 of the second fixing member 80 are coupled to the recesses 5033, thereby providing a more secure coupling between the second fixing member 80 and the first fixing member 50.

The first fixing member 50 also includes a set of one or more mounting flanges 5031. The mounting flanges 5031 are formed in the side surface of each panel guide portion 503. The mounting flanges 5031 may be used to couple the display device 10 with another structure, such as a cellular phone housing. For example, chassis covering the panel unit may be coupled with the mounting flanges 5031.

The side wall portion 803 of the second fixing member 80 may be formed by bending the second fixing member 80. Since the second fixing member 80 is formed through a bending process, the strength thereof may be improved depending upon the type of bending process. The receiving members 801 can be formed in the side wall portion 803 at the same time that the side wall portion 803 is formed, thereby facilitating the fabrication of the second fixing member 80.

Figure 2:
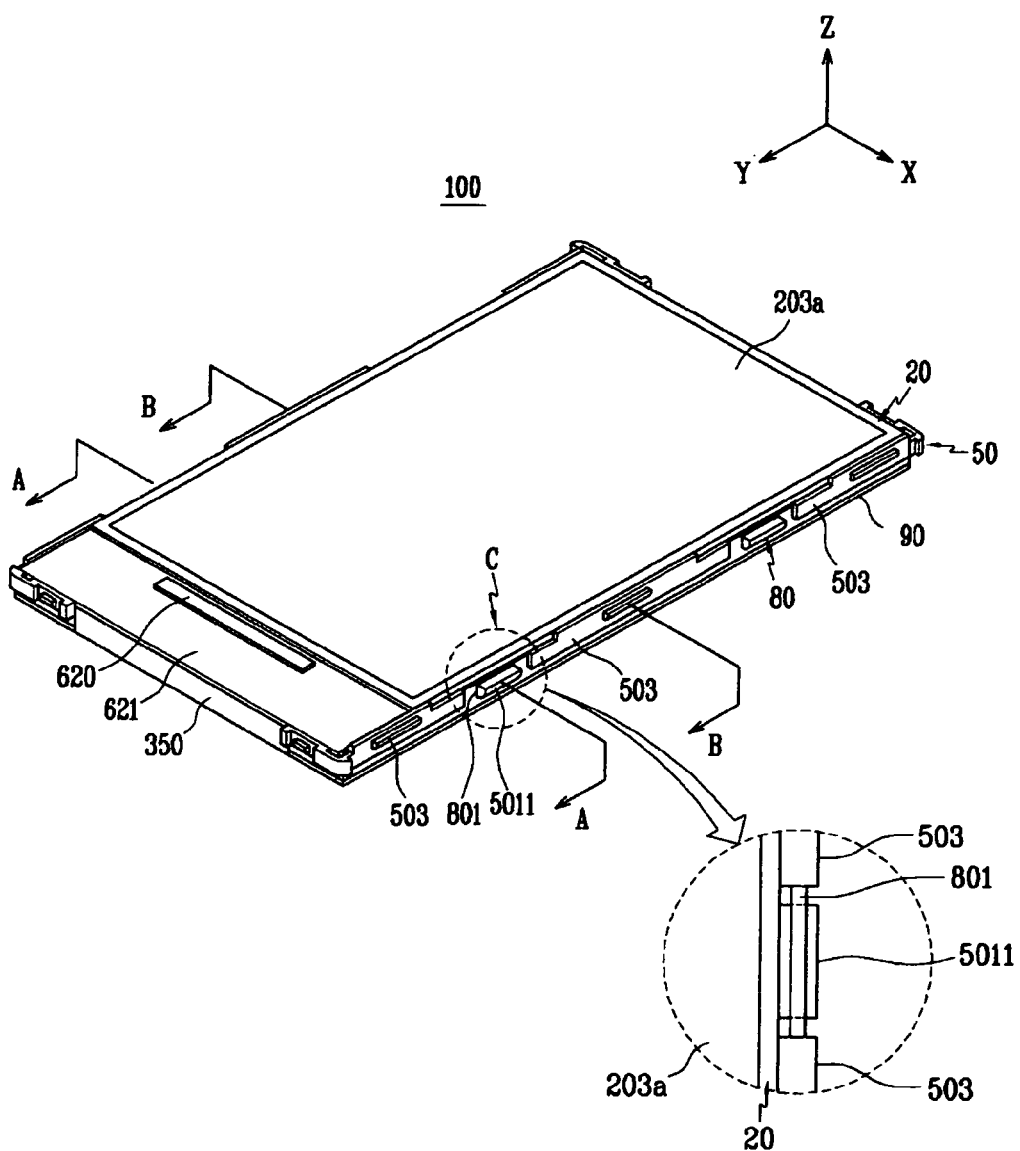
FIG. 2 is a perspective view illustrating the assembled display device according to the first embodiment of the present invention.

FIG. 2 is a perspective view of an assembled display device 100 from in FIG. 1. As shown in FIG. 2, by minimizing the space occupied by the first fixing member 50 and the second fixing member 80, the display area of the panel Unit 20 can be enlarged relative to conventional arrangements.

The side wall portions 803 of the second fixing member 80 are inserted into the recesses 5033 (see FIG. 1) formed at the lower portion of the panel guide portion 503 of the first fixing member 50. Thus, the second fixing member 80 does not extend laterally past the sides of the first fixing member 50. That is, the second fixing member 80 is not positioned on an extension line of the first fixing member 50 but on the same line as the first fixing member 50 in the X axis direction Thus, it is possible to minimize the space occupied by the first fixing member 50 and the second fixing member 80. Accordingly, a larger display area of the panel unit 20 can be provided given the same amount of space in the X axis direction, relative to conventional arrangements.

The flanges 5011 of the first fixing member 50 which coupled to the receiving members 801 of the second fixing member 80 are not formed in the panel guide portions 503 of the first fixing member 50. If the flanges are formed in the panel guide portions 503, the first fixing member 50 would extend too far in the X axis direction, thereby limiting the size of the display area of the panel unit 20.

In the present invention, taking such a situation into consideration, the flanges 5011 are formed directly in the edges of the body portion 501 of the first fixing member 50, not in the panel guide portions 503. The flanges 5011 are formed in a recessed portion between the panel guide portions 503 such that the flanges 5011 do not extend in the X axis direction beyond the panel guide portions 503. In order to minimize the area occupied by the first fixing member 50, the panel guide portions 503 and flanges 5011 are alternately provided along the edges of the body portion 501 of the first fixing member 50. In this way, by minimizing the area occupied by the side surfaces, the flanges 5011, and the mounting flanges 5031 of the first fixing member 50, it is possible to maximize the display area of the panel unit 20 for a given space.

FIG. 2 also shows an enlarged region C of the display device 100, as seen in the Z axis direction. As shown in the enlarged circle of FIG. 2, the flange 5011 extends from the body portion of the first fixing member 50, but does not protrude past the panel guide portions 503. Therefore, the flange 5011 can be compactly coupled to the receiving member 801.

The relationships between the first fixing member 50, the second fixing member 80, and the panel unit 20 are described in greater detail below with reference to the cross-sectional view (FIG. 3) taken along Line A-A of FIG. 2 and the cross-sectional view (FIG. 4) taken along Line B-B of FIG. 2.

Figure 3:
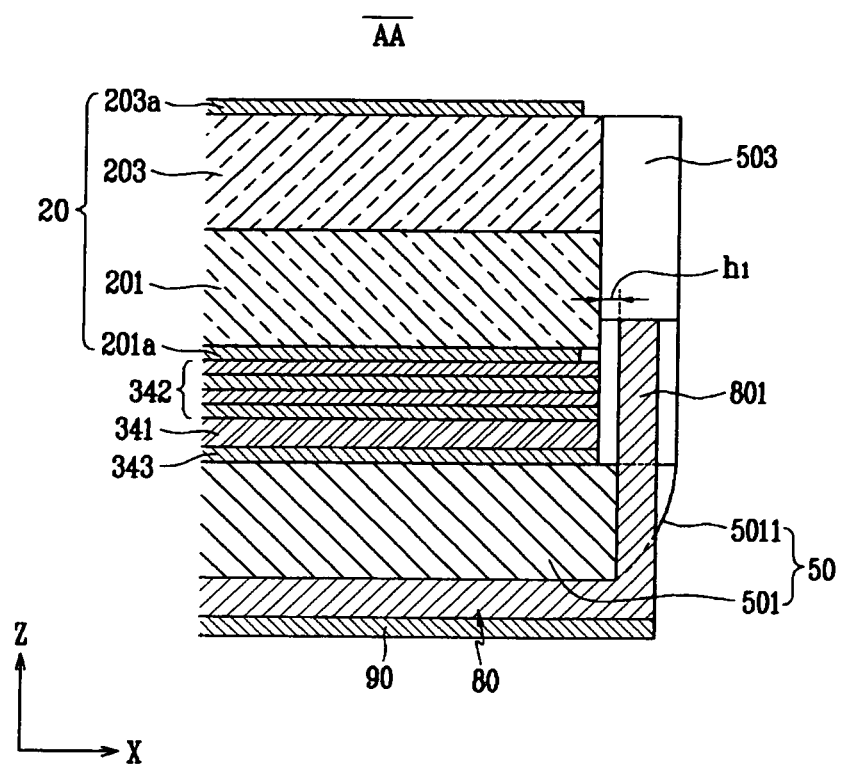
FIG. 3 is a partial cross-sectional view taken along Line A-A of FIG. 2.

FIG. 3 is a partial cross-sectional view taken along Line A-A of FIG. 2. FIG. 3 shows a sectional structure of the display device to emphasize the arrangement of the flange 5011 of the first fixing member 50.

The receiving member 801 is coupled with the flange 5011, which extends from the body portion 501 of the first fixing member 50. When the receiving member 801 is made of metal, contact between the receiving member 801 and the panel unit 20 can cause scratching and damage to the panel unit 20. Accordingly, the receiving member 801 and the panel unit 20 are separated from each other.

Here, the separation gap $h_1$ between the receiving member 801 and the panel unit 20 is preferably 0.2 mm or more. When the separation gap $h_1$ is less than 0.2 mm, external impacts to the display device 100 may cause the receiving member 801 to come in contact with and scratch the panel unit 20. On the other hand, the separation gap $h_1$ is preferably less than or equal to 2.0 mm from the view point of fabrication allowance of the holder 801.

Figure 4:
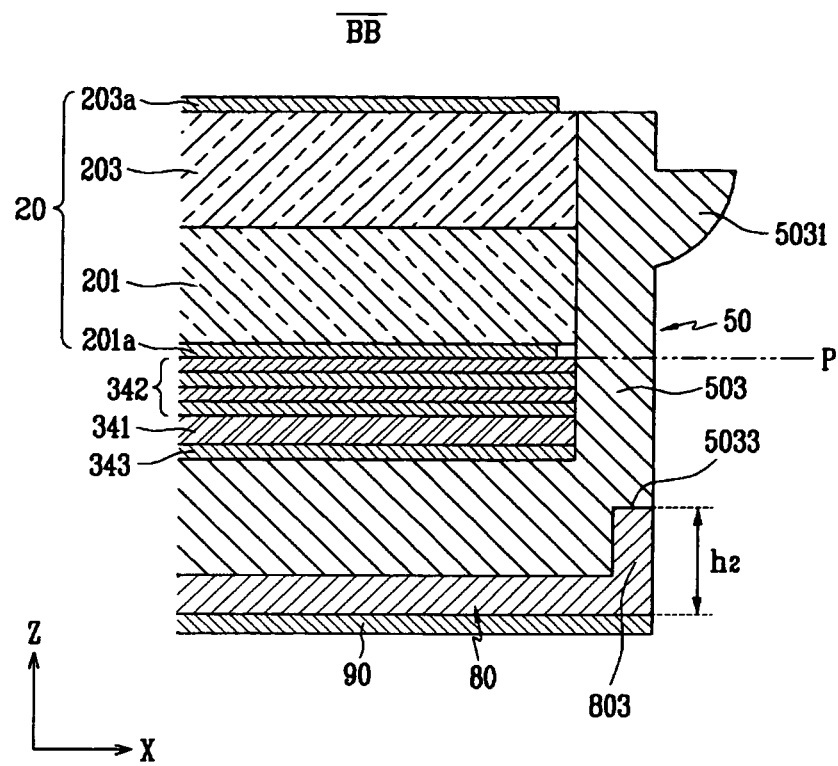
FIG. 4 is a partial cross-sectional view taken along Line B-B of FIG. 2.

FIG. 4 is a partial cross-sectional view taken along Line B-B of FIG. 2. FIG. 4 shows a sectional structure of the display device taken to focus on the recess 5033 of the first fixing member 50.

The side wall portion 803 of the second fixing member 80 is coupled to the recess 5033 formed in the panel guide portion 503 of the first fixing member 50. Since the second fixing member 80 covers the bottom surface of the first fixing member 50, the second fixing member 80 can protect the first fixing member 50 from external impacts. Accordingly, it is important to regulate the height $h_2$ of the side wall portion 803.

In order to provide a secure coupling of the first fixing member 50 and the second fixing member 80, the height $h_2$ of the side wall portion 803 inserted into the recess 5033 is preferably 0.4 mm or more. When the height of the side wall portion 803 is less than 0.4 mm, the first fixing member 50 and the second member 80 may not be securely coupled. On the other hand, it is preferable that the height of the side wall portion 803 be 1.8 mm or less so as not to rise above the level of the polarizer 201a of the TFT panel 201.

As shown in FIG. 4, suppose P indicates a virtual plane extending from the lower surface of the panel unit 20. In this case, the height of the side wall portion 803 of the second fixing member 80 is minimized so as to separate the side wall portion 803 from the extension plane P. Accordingly, the size of the recess 5033 of the first fixing member 50 for mating with the side wall portion 803 can be minimized. As a result, it is possible to minimize the area occupied by the recess 5033 formed in the panel guide portion 503 having a small thickness. Due to the small area occupied by the recess 5033, it is not necessary to form the panel guide portion 503 with an extremely thin profile. Therefore, the panel guide portion 503 may be easily formed using injection molding.

Figure 5:
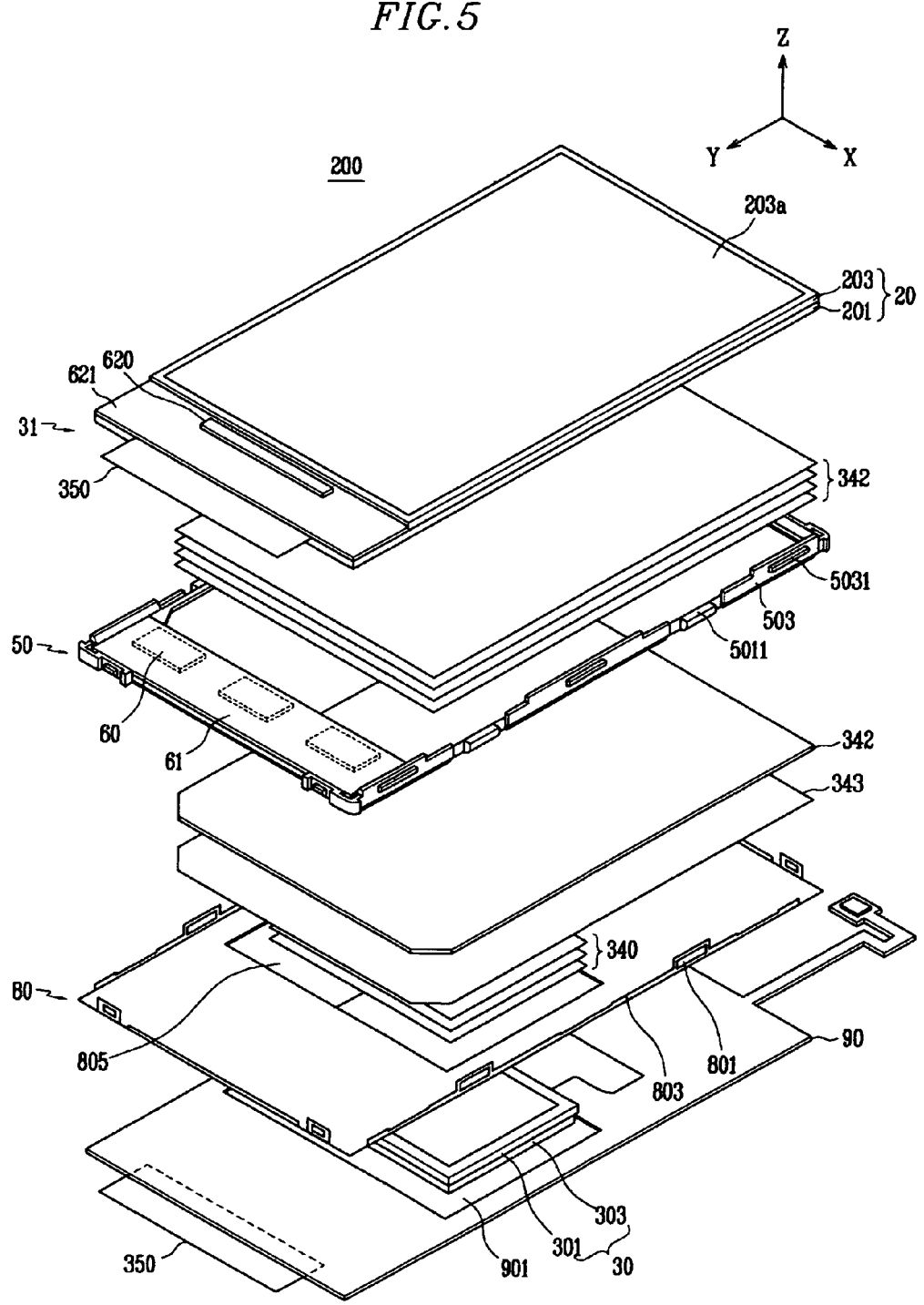
FIG. 5 is an exploded perspective view illustrating a display device according to a second embodiment of the present invention.

FIG. 5 shows an exploded perspective view of a display device 200 according to a second embodiment of the present invention. The display device 200 according to the second embodiment of the present invention has substantially the same basic structure as the display device 100 according to the first embodiment of the present invention, except that two panel units are provided. Therefore, the same elements are denoted by the same reference numerals and descriptions thereof are omitted.

The display device 200 shown in FIG. 5 includes two panel units and may be used as the outer display and inner display for a clamshell-type cellular phone. Accordingly, a large amount of information can be displayed by maximizing the display area of the panel unit. Although two panel units are shown in FIG. 5, it is intended not to limit the present invention, but only to exemplify the present invention. Therefore, in other embodiments, a greater number of panel units may be used.

The panel units include a main panel unit 20 and a sub panel unit 30. Since the structure of the sub panel unit 30 is similar to the structure of the main panel unit 20, its detailed description is omitted. The sub panel unit 30 is supplied with light from the light source 60 through an opening 805 formed in the second fixing member 80. The light can be transmitted and reflected by the reflecting sheet 343. Therefore, the light emitted from the light source 60 is partially transmitted by the reflecting sheet 343 and is supplied to another plurality of optical sheets 340. The light is enhanced as it passes through the optical sheets 340 and is supplied to the sub panel unit 30 to display an image. The sub panel unit 30 is electrically connected to the PCB 90 and is supplied with driving signals from the PCB 90. The sub panel unit 30 is externally exposed through an opening 901 formed in the PCB 90 for the purpose of displaying an image.

According to the second embodiment of the present invention, similar to the first embodiment, it is possible to maximize the display area of the main panel unit 20 by minimizing the area occupied by the first fixing member 50 and the second fixing member 80. Therefore, the main panel unit 20 can be provided with a strong fixing structure while enlarging the display area. As a result, it is possible to prevent damage of the main panel unit 20 due to external impacts.

Although the exemplary embodiments of the present invention have been described, it will be understood by those skilled in the art that the present invention may be modified in various forms without departing from the spirit and scope of the appended claims.

What is claimed is:

1. A display device comprising:
a panel unit for displaying an image through a display surface;
a first fixing member receiving the panel unit, said first fixing member comprising a body portion and at least one flange extending from the edge of the body portion in a direction substantially parallel to the display surface, the body portion of the first fixing member comprising a first bottom portion and a first side portion extended from the first bottom portion; and
a second fixing member coupled to the first fixing member, said second fixing member comprising at least one receiving member receiving the flange, the second fixing member comprising a second bottom portion and a second side portion extended from the second bottom portion;
wherein the first fixing member comprises two or more panel guide portions, each of the panel guide portions including a recess;
wherein the second side portion of the second fixing member further comprises one or more side wall portions, each side wall portion being coupled to a corresponding recess in one of the panel guide portions; and
wherein the at least one receiving member is integrally formed with adjacent side wall portions, the at least one receiving member having an opening that is substantially parallel to adjacent side wall portions,
wherein the first bottom portion is plate-shaped and extends under the panel unit and the second bottom portion is plate-shaped and extends under the panel unit, the first bottom portion contacts the second bottom portion in a Z direction that is perpendicular to the display surface and the first side portion contacts the second side portion in an X direction and Y direction that are orthogonal to the Z direction.

2. The display device of claim 1, wherein each panel guide portion is positioned along an edge of the body portion, wherein the at least one flange is formed between adjacent panel guide portions.

3. The display device of claim 1, wherein the receiving member of the second fixing member is formed in at least one side wall portion of the second fixing member.

4. The display device of claim 3, wherein at least one side wall portion is formed by bending the second fixing member.

5. The display device of claim 1, wherein a height of the side wall portions of the second fixing member received in the recesses is greater than or equal to 0.4 mm.

6. The display device of claim 1, wherein at least one side wall portion of the second fixing member is spaced from a virtual extension surface extending from the surface of the panel unit.

7. The display device of claim 2, wherein another flange is formed on an outer surface of the panel guide portions.

8. The display device of claim 1, wherein the receiving member is spaced from the panel unit.

9. The display device of claim 8, wherein the receiving member is spaced by 0.2 mm or more from the panel unit.

10. The display device of claim 1, further comprising at least one additional panel unit.

11. The display device of claim 1, wherein the panel unit comprises a liquid crystal display panel.

12. The display device of claim 11, further comprising a light source for supplying light to the panel unit.

13. The display device of claim 1, wherein the display device is used for a cellular phone.

14. The display device of claim 2, further comprising a mounting flange formed on each panel guide portion.

15. The display device of claim 1, wherein the at least one receiving member receiving the flange fixes the first fixing member and the second fixing member in the Z direction, and the side wall portion being coupled to a corresponding recess fixes the first fixing member and the second fixing member in the X direction and the Y direction.

* * * * *